(No Model.)
T. OLDROYD.
NUT LOCK.
No. 569,423. Patented Oct. 13, 1896.
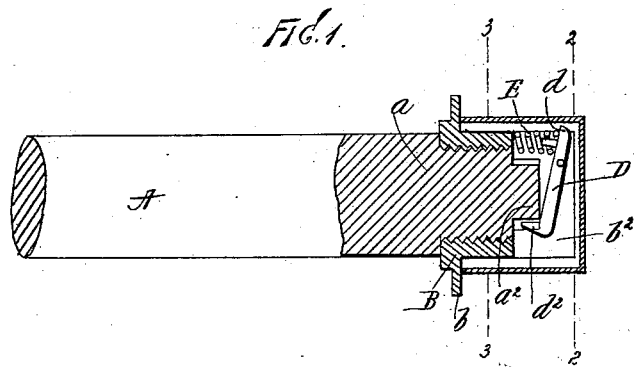
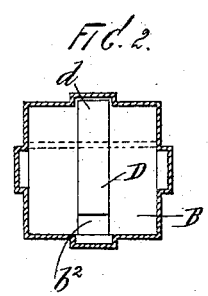 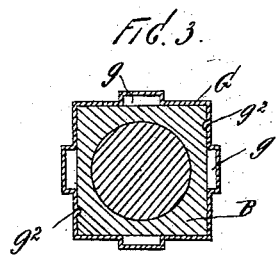
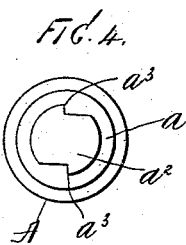
WITNESSES:
John Buckler,
C. Gersh
INVENTOR
Thomas Oldroyd,
BY
Edgar Tate & Co.
ATTORNEYS.

UNITED STATES PATENT OFFICE.

THOMAS OLDROYD, OF NEW LONDON, CONNECTICUT.

NUT-LOCK.

SPECIFICATION forming part of Letters Patent No. 569,423, dated October 13, 1896.

Application filed March 10, 1896. Serial No. 582,555. (No model.)

*To all whom it may concern:*

Be it known that I, THOMAS OLDROYD, a citizen of the United States, and a resident of New London, in the county of New London and State of Connecticut, have invented certain new and useful Improvements in Nut-Locks, of which the following is a specification, reference being had to the accompanying drawings, forming a part thereof, in which similar letters of reference indicate corresponding parts.

This invention relates to the spindles of vehicles, such as carriages, trucks, wagons, &c., and the object thereof is to provide an improved nut-lock for securing in position upon the spindles the nuts by which the wheels are held thereon.

The invention is fully disclosed in the following specification, of which the accompanying drawings form a part, in which—

Figure 1 is a side view of a portion of a spindle of a vehicle, showing the nut mounted thereon in central vertical section and also showing the means by which said nut is locked in position. Fig. 2 is an end view of the nut on the line 2 2 of Fig. 1, showing an outer cap or cover which I employ in section; Fig. 3, a section on the line 3 3 of Fig. 1, and Fig. 4 an end view of the spindle with the nut and the cap removed.

In the drawings forming part of this specification, A represents the spindle of a vehicle, and the spindle A is provided with a reduced screw-threaded extension $a$, on the end of which is formed a short cylindrical extension $a^2$, which is provided on its opposite sides with shoulders or projections $a^3$, which are formed on a radial line and the sides of which are cut out at right angles to the shoulders or projections. I also provide a nut B, having an annular flange or rim $b$, and said nut is provided with a transverse slot $b^2$ in the outer end thereof, and pivoted between the sides of the nut which are formed by said slot is a lever D, one end of which projects through the slot slightly beyond the walls of the nut, as shown at $d$, and the other end of which is provided with a projection or shoulder $d^2$, which is adapted to operate in connection with the shoulders or projections $a^3$ on the extensions $a^2$ of the spindle, and mounted between the outer end of the lever D and the inner wall of the slot $b^2$ is a spiral spring E, which operates to force the outer end of the lever outwardly and the shoulder or projection $d^2$ thereon into engagement with one of the shoulders or projections $a^3$. I also provide a removable cap or cover G, and this cap or cover is rectangular in cross-section, so as to correspond with the shape of the nut B, which is similarly formed, and each side of the cap or cover G is provided with longitudinal grooves in its inner walls, as shown at $g$, into one of which the outer end of the lever D projects.

The operation will be readily understood from the foregoing description when taken in connection with the accompanying drawings and the following statement thereof. When it is desired to remove the nut, the cap G must first be removed and the outer end of the lever D pressed inwardly, after which the nut B may easily be detached from the spindle in the usual manner. The nut B is screwed onto the spindle in the same manner as ordinary nuts, the shoulders or projections $d^2$ of the lever moving freely over the shoulders or projections $a^3$ to permit of this operation, but said nut cannot be turned backwardly without pressing in the outer end of the lever, as above described, so as to liberate the shoulder or projection $d^2$ thereon from the shoulders or projections $a^3$. The cap G is held in place by friction or by small inwardly-directed lugs or rounded projections $g^2$, which are adapted to operate in corresponding depressions formed in the side of the nut, and said cap is also, preferably, composed of stiff spring metal.

This device is simple in construction and operation and perfectly adapted to accomplish the result for which it is intended, and it may be applied to the ends of bolts, rods, spindles, and shafts wherever lock-nuts are required.

Having fully described my invention, I claim as new and desire to secure by Letters Patent—

The combination with the end of a spindle, rod or bolt, of the herein-described nut which is adapted to be mounted thereon, said spindle being provided with a cylindrical extension on which are formed shoulders or projections, said nut having an annular flange or rim B, and having formed therein a transverse slot $b^2$, in which is pivoted a lever D, one end of which projects through the slot slightly beyond the walls of the nut, the other end of said shoulder being provided with a projection $d^2$ adapted to operate in connection with the shoulders or projections in the extension of the spindle, and a spiral spring E adapted to force the end of the lever outwardly, and a cap or cover G, rectangular in cross-section, and having formed in one side thereof longitudinal grooves adapted to receive the end of said lever, as set forth.

In testimony that I claim the foregoing as my invention I have signed my name, in presence of the subscribing witnesses, this 5th day of March, 1896.

THOMAS OLDROYD.

Witnesses:
JOHN F. SULLIVAN,
JOHN C. GEARY.